(12) United States Patent
Tulloch et al.

(10) Patent No.: US 6,297,900 B1
(45) Date of Patent: Oct. 2, 2001

(54) ELECTROPHOTOCHROMIC SMART WINDOWS AND METHODS

(75) Inventors: Gavin Edmund Tulloch, Queanbeyan; Igor Lvovich Skryabin, Yarralumla, both of (AU)

(73) Assignee: Sustainable Technologies Australia Limited, Queanbeyan (AU)

( * ) Notice: Subject to any disclaimer, the term of this patent is extended or adjusted under 35 U.S.C. 154(b) by 0 days.

(21) Appl. No.: 09/463,424

(22) PCT Filed: Jul. 22, 1998

(86) PCT No.: PCT/AU98/00579

§ 371 Date: Jan. 21, 1998

§ 102(e) Date: Jan. 21, 1998

(87) PCT Pub. No.: WO99/05566

PCT Pub. Date: Feb. 4, 1999

(30) Foreign Application Priority Data

Jul. 22, 1997 (AU) .................................................. PO 8160

(51) Int. Cl.$^7$ ..................................................... G02F 1/153
(52) U.S. Cl. ........................................... 359/275; 359/265
(58) Field of Search ..................................... 359/257, 258, 359/259, 260, 261, 262, 263, 264, 265, 266, 252, 253, 254, 245, 267, 275, 274, 273, 272, 271

(56) References Cited

U.S. PATENT DOCUMENTS

| | | | |
|---|---|---|---|
| 4,475,031 | 10/1984 | Mockovciak | 250/212 |
| 4,512,637 | 4/1985 | Carl-Zeiss | 350/357 |
| 4,529,275 | 7/1985 | Carl-Zeiss | 350/357 |
| 4,968,127 | 11/1990 | Russell et al. | 351/44 |
| 5,015,086 | 5/1991 | Okaus | 351/44 |
| 5,365,365 | 11/1994 | Ripoche et al. | 359/267 |
| 5,377,037 | 12/1994 | Branz et al. | 359/265 |
| 5,384,653 | 1/1995 | Benson et al. | 359/270 |
| 5,457,564 | 10/1995 | Leventis et al. | 359/271 |
| 5,604,626 | 2/1997 | Teowee et al. | 359/265 |
| 6,057,956 | * 5/2000 | Ash et al. | 359/267 |

FOREIGN PATENT DOCUMENTS

| | | |
|---|---|---|
| WO 89/09428 | 10/1989 | (WO) . |
| WO 91/16719 | 10/1991 | (WO) . |
| WO 96/08022 | 3/1996 | (WO) . |
| WO 97/28484 | 8/1997 | (WO) . |
| WO 97/45767 | 12/1997 | (WO) . |
| WO 98/16870 | 4/1998 | (WO) . |

* cited by examiner

Primary Examiner—Hung Xuan Dang
(74) Attorney, Agent, or Firm—Davis & Bujold, P.L.L.C.

(57) ABSTRACT

A smart window comprising a regenerative photolectrochomic (RPEC) photovoltaic element (108) juxtaposed with an electrochromic (EC) element (110). Microprocessor-based control mechanism (200) connecting the RPEC element to the EC element for controlling the current delivered to and from the EC element. The controller (200) including look-up tables (204 and 206) for determining the safe current to or from the EC element having regard to the amount of charge to be delivered or removed and the charge status of the EC element, the determination of charge status, charge still required and current to be delivered being made frequently to ensure that the current is kept within safe limits while minimizing switching times. New smart windows are also disclosed.

9 Claims, 4 Drawing Sheets

ELECTROPHOTOCHROMIC SMART WINDOWS AND METHODS

TECHNICAL FIELD

This invention relates to smart windows suitable for use in the glazing of buildings. The smart windows concerned are those which have (i) electrochromic (EC) elements that can be darkened (ie, made to be more coloured or less transparent) or bleached (ie, made to be less dark or more transparent) by the addition or extraction of electric charge, and (ii) photoelectric (PE) elements which can supply the electric charge needed to effect the darkening of the EC elements when the window is exposed to sunlight. Such combined PE-EC devices are sometimes called 'photoelectrochromic' (PEC) devices.

The preferred PE elements for use in the PEC smart windows of this invention are those of the dye-sensitised regenerative photoelectrochemical (RPEC) type wherein photons striking a solid semiconductor photoelectrode produce charge carriers that are separated at a junction between the electrode and a liquid electrolyte, when the photoelectrode and the electrolyte are connected by an external electrical circuit. In RPEC electrochemical cells, charge carriers (electrons) are transported by the electrolyte without causing a chemical change in the electrolyte because of a regenerative physical chemical cycle.

The invention also relates to electronic control means for interconnecting the PV and EC elements of PEC devices to regulate current flow from one to the other in such a manner as to maximise switching times while avoiding damage to the EC device. However, the control means disclosed herein can be applied to the control of EC cells which are not part of PEC devices.

BACKGROUND TO THE INVENTION

PEC Devices

The smart windows to which this invention is applicable typically have large surface areas and must be made at prices not too dissimilar from other specialist glazing materials used in the building industry. This is most difficult to achieve with complex PEC devices having the necessary clarity, whether darkened or bleached. Further, the PE and EC elements of a PEG window are inherently mismatched so that darkening tends to be non-uniform, partial and/or excessively slow.

A sun-sensitive smart window using a layer of liquid nematic crystals, controlled by external PE cells arranged to receive sunlight passing through the window, was disclosed by Mockovciak in U.S. Pat. No. 4,475,031. Sufficient PE cells were employed to provide the necessary voltage to darken the liquid crystal layer and a voltage regulator was used to ensure that the window was darkened according to the intensity of the incident light. However, a liquid crystal layer does not make a satisfactory electro-optical modulating material for a smart window as clarity is poor, particularly when the window is darkened. Also, since the PE cells and the voltage regulator must be installed separately from the window, the mounting and connection of this smart window will be expensive and unsightly. Others, such as Russell et al in U.S. Pat. No. 4,968,127 and Okaus in U.S. Pat. No. 6,015,086, have also disclosed similar self-powered sun-sensitive devices for use in spectacles U.S. Pat. No. 5,384,653 to Benson discloses a double-glazed self-powered smart-window which employs a large-area EC element formed on a glass substrate, around the edge of which a plurality of silicon-based PE cells are formed by successive layer deposition. Sufficient PE cells are connected in series to provide the necessary switching voltage A selector switch is used to connect the EC cell to either the output of the PE cells or to an external power source such as a battery. A reversing switch is used to reverse the polarity of the selected power source to effect the darkening or bleaching of the EC cell. Although the device is essentially self-contained, the various layers required for the EC device and the PE cells are deposited under vacuum using masks by conventional PVD (physical vapour deposition), sputtering or CVD (chemical vapour deposition) techniques, severely limiting the area of window and making the device expensive. Also, the electrical arrangement necessitates the use of the same voltage for bleaching as for darkening which either results in excessively slow switching times or damage to the EC cell. Finally, the area of the window available to the PE cells is small so the power output from them is also small; moreover, the PE cells are unsightly. U.S. Pat. No. 5,457,564 to Levantis et al discloses an EC cell for use as a smart window, the cell having a pair of complementary electrochromic polymers plated onto respective transparent electrodes that are sputtered onto a pair of spaced glass substrates, the space being filled with an electrolyte The cell is powered by externally-located silicon-based PE cells arranged behind the device (with respect to the incident light). Light falling on the cells generates sufficient current to darken the electrochromic device and thereby reduce the light transmitted. Removal of the incident light allows the electrochromic device to discharge through the cells (which then act as forwardly-biased diodes), restoring the transparency of the device. Again, since the PE cells and the voltage regulator must be installed separately from the window, the mounting and connection of this smart window will be expensive and unsightly Also, electrical control of the window will not be satisfactory since the threshold voltage of silicon PE cells (acting as diodes) is a substantial proportion of the voltage needed to bleach the window. Bleaching will thus be partial and slow so that darkening will be far from proportional to incident light intensity over a diurnal cycle.

U.S. Pat. No. 5,377,037 to Branz et al, disclosed a PEC device for use with spectacle lenses comprising a self-regulating combination of a silicon-based PE cell and an EC cell each formed by the deposition of thin transparent layers on the lens surface. As about eight thin layers of transparent materials, including the electrolyte of the EC cell, must be laid down in succession by PVD, sputtering or CVD techniques on one glass substrate, the resultant multi-layer coating will be expensive and, not being protected by a second glass substrate will be delicate. These features make such a PEC device unsuited for use in smart windows. The PE cell of the Branz et al device is directly connected to EC cell, preferably via a bleed resistor, with the intention of making the PEC device self-darkening or 'sun-sensitive'. However, the self-darkening function of the Branz PEC device will suffer from the same disadvantages as indicated in respect of the Levantis device. Further, since only one silicon PE cell is employed for each EC cell, the voltage will be insufficient to effect the rapid darkening necessary for spectacles, or even the more gradual darkening needed for smart windows.

In a Letter to Nature [Vol. 383, Oct. 17, 1996], Bechinger et al report the development of a PEG cell in which a photovolatic film forms one electrode and an electrochromic film forms the other electrode of the cell. The PE element used was the RPEC cell disclosed in the international patent applications WO 91/16719 and WO 96/08022 by Graetzel et al which employs a transparent dyesensitised nano-crystalline $TiO_2$ semiconductor photoelectrode, a Pt coated counter electrode and a liquid electrolyte arranged therebetween The EC element used was based upon the conventional $WO_3$-$Li^+$ system using a liquid polymer electrolyte containing the $Li^+$ ions. When such a PEC cell is exposed to light in an open-circuit condition (ie, without its electrodes being connected together), the voltage developed by the PE element does not cause darkening of the cell (as no current flows and Li ions are not transported to the working electrode of the EC element). When the exposed cell is short-circuited, current flows to carry the Li ions to the working electrode and darken the cell. Though the reported experiments were with small area cells (1 $cm^2$ and 25 $cm^2$), spatially localised darkening was noticeable. It was suggested that this would be an advantage where the cells were to be used for display purposes as they could be written-to using a laser beam or the like. However, this property is a serious disadvantage for large area smart windows. Moreover, the range and speed of darkening and bleaching control available by simply short-circuiting and open-circuiting the cell is limited due to the very low voltage/current available from the single RPEC cell.

Charge Control in EC Smart Windows

EC smart windows are inherently slow to switch between darkened and bleached states but great care must be taken in attempting to speed up the transition by increasing the charge rate and amount of charge delivered:

The working life (the number of cycles) of an EC cell will be seriously reduced if it is charged or discharged too fast or too much;

Because the rate of darkening/bleaching is diffusion-limited, excessive localised charge concentrations can occur with resulting damage.

Because the charging voltage is normally applied via a very thin TCO (transparent conducting oxide) film, the voltage is distributed unevenly over the film, again leading to the danger of excessive localised charge concentrations.

As a CE cell ages its charging characteristics change, so a charge (or charge rate) which was safe when the cell was new will no longer be safe when it is old.

It is known to use integration techniques to keep track of the charge-state of an EC cell when it is being incrementally charged and discharged so that the danger of excessive charging/discharging is reduced. U.S. Pat. No. 4,512,637 and 4,529,275 to Carl-Zeiss disclose the use constant current charging and a digital counter to keep track of the charge-state of the cell (through successive full or partial charging and/or discharging actions) so that the danger of total overcharging is mitigated. U.S. Pat. No. 6,365,365 to Saint Gobain discloses the use of a reference capacitor which serves as an analogue of the cell and is charged and discharged with the cell. When an incremental change in colouration (darkening) is required, the desired colouration is 'dialled-in' as a reference voltage which is compared with the voltage on the capacitor. The cell and capacitor are then discharged or charged (as required) to bring the capacitor voltage to the reference voltage. This method has the advantage that self-bleaching (or discharge) of the cell can be compensated during intervals between incremental colouration or bleaching. However, neither the Carl-Zeiss nor the Saint Gobain disclosure is concerned with ensuring optimum charge-rates, not can they compensate for the aging of EC cells.

In our prior international patent application WO 98/16870, we disclosed a method of controlling an EC cell which adjusted charge rates to mitigate the danger of cell damage without an excessive trade-off in switching time. To charge (darken) an EC cell, a constant current is applied until a predetermined maximum voltage is reached, after which charging proceeds at constant voltage until either a maximum safe charge (in Coulombs) has been delivered or the charge rate (in Amperes) falls below a predetermined level. Since the maximum voltage will be reached earlier with old cells than with new cells, the method provides a degree of compensation for cell aging, A recent international patent application, WO 97/28484 by Pilkington PLC, disclosed a similar approach except that charging is continued at constant voltage for a predetermined time after the maximum voltage limit is reached.

However, these methods switch the cells more slowly then necessary because. (i) the initial constant-current limit must be set conservatively, (ii) this limit is—inappropriately—the same for new and old cells and (iii) the charge rate is reduced well below the safe level during the initial stages of the constant voltage regime.

OBJECTIVES OF THE INVENTION

It is an object of the present invention to provide PEC smart windows in which one or more of the problems of the prior art device noted is or are reduced.

It is also desirable, but not essential, to provide a PEG smart window incorporating electronic control means that allows improved EC cell switching times with less risk of damaging the cell. It will be appreciated that, while such control means may have particular application to PE devices, they will be applicable to the control of EC cells generally.

OUTLINE OF INVENTION

In one aspect, this invention is based upon the realisation that the EC elements of the PEG devices of the prior art cannot be controlled satisfactorily if (i) they are powered from a single RPEC cell, (ii) the polarity of the PE cell cannot be reversed between bleaching and darkening, and/or (iii) the same voltage is applied for both darkening and bleaching. Accordingly, in one aspect, the invention comprises a PEC device in which an PE (preferably RPEC) element is arranged so that its polarity can be reversed and/or otherwise controllably applied to the EC element using electronic control means. The PE element may be formed as a plurality of separate cells from which more than one output voltage is derived so that, by use of the control means, one voltage of one polarity can be connected to darken the EC element and another voltage of another polarity can be connected to bleach the EC element. Thus, both darkening and bleaching will occur more quickly and more completely than can be achieved using a single RPEC cell. To achieve these benefits, the EC element and the PE element of a PEC device cannot have both electrodes common.

We have found that the requirements for the electrolyte of an RPEC cell are quite different from those for an electrolyte of an EC cell, so it is undesirable for an RPEC-type PE element and an EC element of a PEC device to employ a common electrolyte (and, therefore, to share both electrodes). The electrolyte of an EC cell needs to have a relatively high resistivity to compensate for uneven voltage distribution on thin TCO conductors and it needs to buffer and transport $Li^+$ ions efficiently. The electrolyte of an RPEC cell needs to have a low resistivity (normally well below 100 ohm.cm) so as to transport ions efficiently. However, low resistivity electrolyte in a large area (>0.1 m$^2$) EC cell will exacerbate voltage gradients in TCO films leading to the damage of the working electrode in regions of high voltage or, if damage is to be avoided, to slow switching times and non-uniform colouration.

We have found it useful to define a voltage non-uniformity ratio, Vnr, for a given location on a TC film and for a given time after the application of a source voltage to one edge of the film, as $Vnr(t)=V(D,t)\int V(L/2,t)>1$, where V(D,t) is the voltage at the given location at time t, D is the distance of the given location from the edge of the TC film, V(L/2,t) is a reference voltage at time t which is a function of half of the length of one side of the TC film. Vnr increases exponentially with the side length of the TC film (ie the size of the cell). It will, of course, be affected by the thickness of the electrolyte of the cell, a thicker electrolyte reducing Vnr. This ratio is always greater than unity and we have found that it is desirable to ensure that it is below 3, and preferably less than 2, if the danger of cell damage is to be avoided upon the application of the normal maximum safe cell-voltage. For example, for a 40 cm by 40 cm EC cell of 1 mm thickness, an electrolyte have a resistivity of 20 kOhms.cm will yield a Vnr of 4.7, indicating that the cell will be highly prone to damage. If the resistivity of the electrolyte of that cell is increased to 55 kOhms.cm, the Vnr is reduced to 2.0. Note that the same result could be achieved with the 20 KOhm electrolyte by increasing the thickness of the cell to 5.5 mm, which would not be commercially feasible.

Not only is voltage variation over a TCO conductor of an RPEC cell of no concern (since current is generated at all illuminated points within the cell), but the working electrode of a RPEC cell is not prone to damage by excessive charge concentration like that of an EC cell.

The PE element may be divided into a plurality of separate RPEC cells formed between a common pair of transparent panes, each cell preferably extending across the pane/window (in any direction). Smart windows with between three and 10 strip-cells are preferred, though many more cells can be employed on large windows. It is generally preferred to use a three-pane arrangement in which the RPEC cells of the PE element are formed as strips between one outer pane and the inner pane, and in which the EC element is formed as a single cell which extends across the whole window between the inner pane and the other outer pane. The individual cells of the PE element can be both series-coupled and separated from one another by the use of walls of transparent electrically conducting polymer applied to one or both the relevant panes (before assembly). Because the walls will be many times wider than they are high and the leakage of current between adjacent cells laterally through the walls will be negligible while current will be readily able to flow from the electrode of one cell to the next through the wall. The gap between the panes of a typical RPEC cell (ie, the wall height) is measured in tens of microns while the spacing between cells (ie, the wall width) will normally be at least a millimetre wide. As indicated above, an intermediate voltage may be tapped from the series of PE cells and used for discharging the EC cell while the full voltage is used for charging the cell.

From the standpoint of manufacturing cost it is desirable to for the coatings of the PEC smart windows of this inversion to be applied by sol-gel techniques using simple dipping and/or screen-printing methods. Such methods are known in the art and are not part of the present invention. However, there is substantial advantage in employing the same electrode materials on each side of the centre pane of a three-pane window since this allows the pane to be coated in a single dipping operation and fired in a single baking operation (assuming the glass is supplied pre-coated with TCO conductors on each side). This can be done if, in accordance with an optional feature of the present invention, TiO$_2$ is used for both the working electrode(s) of the RPEC cell(s) and the counter electrode of the EC cell.

While the electronic control means can be arranged to switch the cells into various series/parallel configurations with positive or negative polarity, it will be generally preferable for the cells to be permanently connected in series and for the control means to regulate the charging and discharging of the EC element by reference to a stored safe charging profile determined theoretically or (preferably) empirically for the size and type of EC element employed. The safe charging profile is preferably stored in the form of two look-up tables (one for charging and one for discharging) in an EPROM (or other firmware) accessible to a microprocessor control means. It relates the charging/discharging current that can be safely delivered/extracted to/from the EC at any instant to the total charge (Coulombs) which has been delivered/extracted. These profiles are best determined empirically but, in general, they will exhibit an exponential decay character as a cell reaches the fully charged or discharged state.

The microprocessor control means thus sets the current delivered to/from the cell at any instant according to this profile, thereby effecting the minimum switching times without risk of damage to the EC cell. Where the window is being switched between partially-darkened states over long time intervals, it will be desirable for the control means to 'zero' the window by effecting a full discharge before taking the window to the new desired partially darkened state. This will avoid inaccuracies arising due to self-discharging of the EC cell. The use of a microprocessor controller also allows scaling or other adjustment of the stored profile according to the number of times the EC cell has been cycled or according to the rate of voltage increase during initial charging (as proxies for cell aging).

A battery can be included in the control means with advantage, since it can be charged from the PE element when the window is not being switched and since it can then be used to power the control means and the window when there is insufficient light to generate the necessary power from the PE element. For example, people in a building may wish to darken their windows for privacy purposes at night. The entire window can thus be self-contained with the control means and the battery located within the frame.

DESCRIPTION OF EXAMPLES

Having broadly portrayed the nature of the present invention, examples of PEC smart windows and their control means will now be described by way of illustration. In the following description, reference wilt be made to the accompanying drawings in which.

Figure 1:
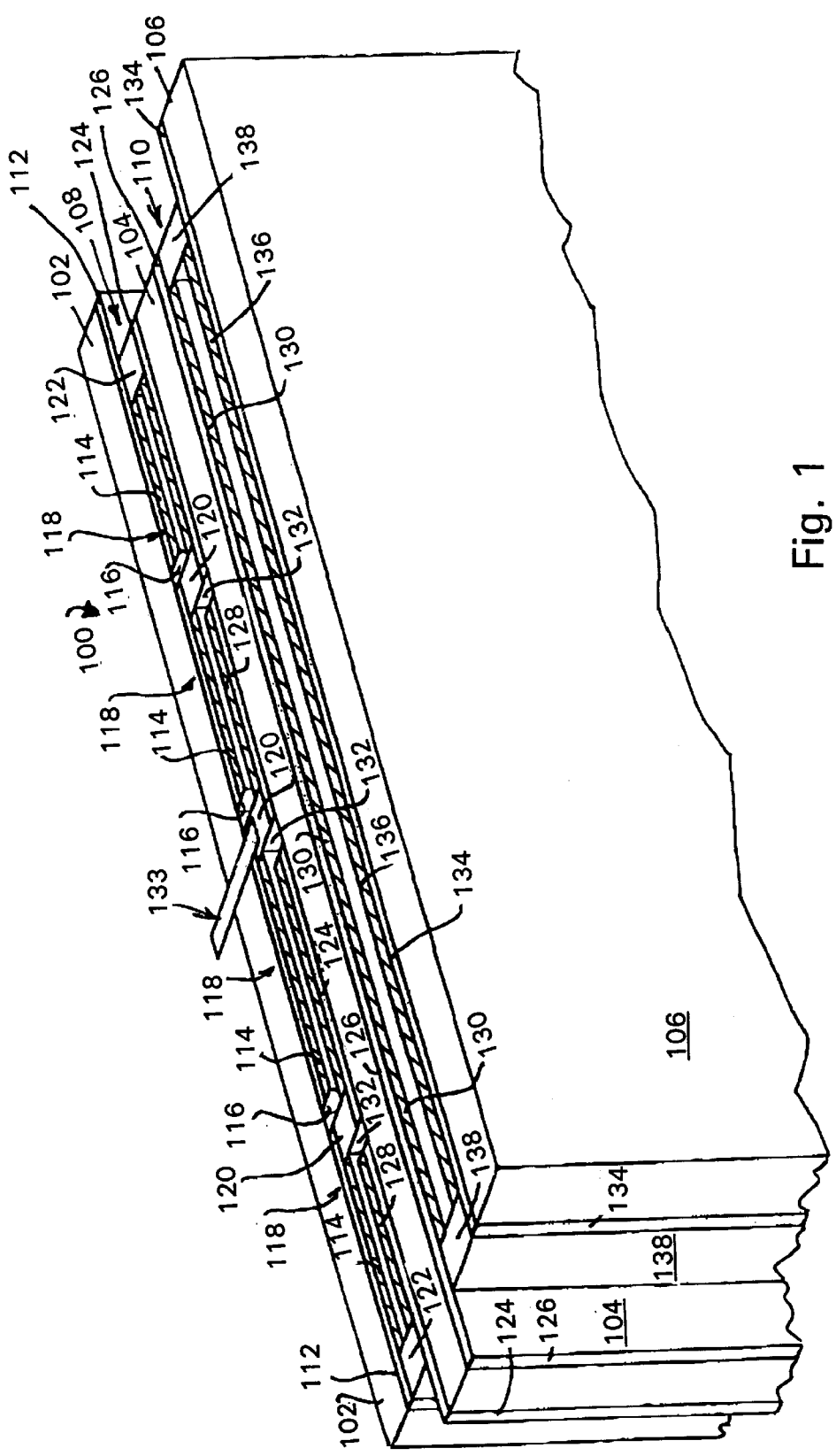
FIG. 1 is a perspective view (not to scale) from above of the top edge of an unsealed and unframed three-pane PEC smart window which forms the first example of the present invention.

The chosen example of a smart window 100, illustrated in FIG. 1, incorporates three closely spaced glass panes: a first outer pane 102, an inner or centre pane 104 and a second outer pane 106 which are normally fitted together into a window frame (not shown). In this example, pane 102 is located on the outside of the window and pane 106 is located on the inside of the window in relation to a room or building. A four-cell RPEC PE element 108 is located between outside pane 102 and centre pane 104 and a single-cell EC element 110 is located between centre pane 104 and inside pane 106. For the purpose of illustration, the thickness of the cells and their components has been greatly exaggerated in relation to the thickness of the panes in FIG. 1. The panes 102, 104 and 106 are formed from commercial TCO-coated glass obtainable from suppliers such as Asahi and Pilkington, inside and outside panes 102 and 106 having TCO coatings on one side only while centre pane 104 has TCO coatings on both sides. In FIG. 1, the TCO coatings are shown shaded while the cell electrode layers applied to them are shown hatched.

Before assembly, the TCO layer 112 of outside pane 102 is coated by dipping or screen-printing with a solution containing Pt which, after baking or drying, forms a coating 114 which need only be a few molecules thick. The TCO and Pt layers are then removed by laser-ablation to form three narrow channels 116 running from one edge of pane 102 to the other. These channels serve to define and to electrically isolate the four cells 118 of the RPEC element 108 from one another. Also before assembly, three parallel beads of a sticky transparent conducting polymer are extruded onto the coated TCO layer 112 along one side of each channel 116 to form, after assembly, the walls 120 that physically separate each of cells 118 from one another. Also before assembly, beads of non-conducting sticky polymer are applied to all edges of the coated side of pane 102 to form (after assembly) edge seals 122. In the drawing, the edge seal along the upper edge of the pane is not shown for clarity.

Centre pane 104 has an outside TCO layer 124 and an inside TCO layer 126. Before assembly, coated pane 104 is dipped into a sol-gel solution capable of generating (upon baking) a thin coating (typically 25–50 micron thick) of micro-crystalline $TiO_2$ on the TCO surfaces. In FIG. 1, the resultant $TiO_2$ coating on outside TCO layer 124 is shown at 128 and the coating on inside TCO layer 126 is shown at 130. After the $TiO_2$ layers 126 and 128 have been formed, a thin (of the order of molecules thick—not shown in the drawing) coating of a sensitising dye is applied to at least outside $TiO_2$ coating 128 on centre pane 104. Finally, before assembly with outside pane 1021 three slots or channels 132 are cut by laser-ablation in the coatings on the outside face of centre pane 104 to electrically isolate adjacent RPEC cells 118 from one another.

From an inspection of FIG. 1, it will be seen that outside pane 102 extends a little to the right beyond centre pane 104 and that centre pane 104 extends a little to the left beyond the end of outside pane 102. This is to allow large-area electrical terminals to be applied to the protruding coated sides of these panes. It will also be seen that the four RPEC cells 118 are (after window assembly) electrically connected in series by conducting walls 120. Thus the output of the four series-connected cells appears between the left hand extremity of TCO layer 124 of centre pane 104 and the right hand extremity of TCO layer 112 of outside pane 102. Finally, a central conducting lead 133 is affixed to the central conducting wall 120 to provide an intermediate voltage output from the group of RPEC cells 118.

Inside pane 106 has its TCO layer 134 arranged on its outside (with respect to the building) or its inner (with respect to the layers of window 100) face. Before assembly against centre pane 104, TCO layer 124 is coated by sol-gel methods with a $WO_3$ layer 136 that forms the working electrode of EC cell 110. Also before assembly, beads of sticky insulating polymer are extruded around the peripheral edges of pane 106 to form, upon assembly of panes 104 and 106, edge seals 138 In the present example, the four RPEC cells 18 are connected in series so that a total of a little over two volts is available for driving the EC cell, a little over one volt being available from central lead 133. Generally, five or six series-connected RPEC cells are preferred in order to generate a convenient voltage for battery charging and for the control unit.

Before the panes of window 100 are been assembled and sealed as describe above, small holes are drilled in the outer panes 102 and 104 to allow the appropriate electrolytes to be introduced under vacuum and/or by capillary action. A small reservoir of the electrolyte may be kept connected to each cell to compensate for changing cell volumes due to thermal expansion and contraction. The formulation of the electrolytes, like the detailed formulation of the working and counter electrodes of the RPEC and EC cells, do not form part of this invention and are available from the Graetzel and Bechinger publications already mentioned. Similarly, the operation of each type of cell is well known and is not part of the present invention. It will also be appreciated that $TiO_2$ may not be preferred as the counter electrode of the EC cell and that the more usual $VO_5$ counter electrode may be employed instead, with the penalty that centre pane 104 cannot then be dip-coated on both sides at once and its coatings cannot be cured in a single firing step. Without the constraint of a $TiO_2$ coating on both sides of centre pane 104, the positions of the working and counter electrodes of the RPEC and EC cells can be changed from the positions indicated in the above described example.

Figure 2:
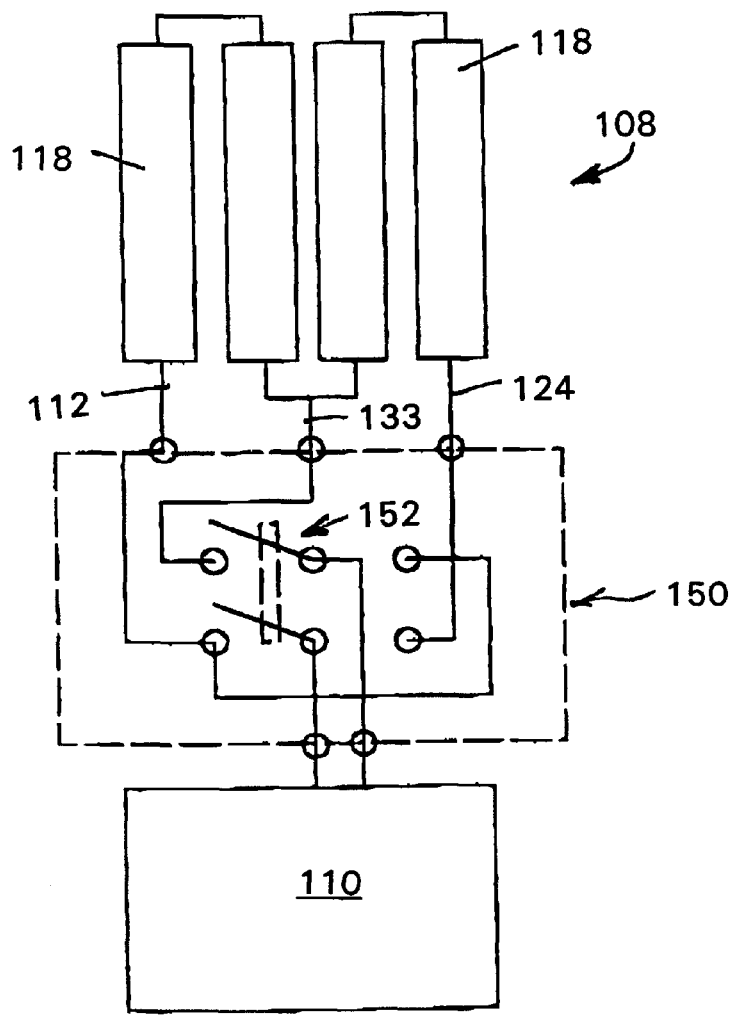
FIG. 2 is a block diagram of an example of a simple switch-based control means suitable for use with the window of FIG. 1.

FIG. 2 is a block diagram illustrating a simple control means 150 based upon a two-pole three-position manual switch 152, the poles of which are connected to the EC element 110 of smart window 100. The three outputs, 112, 133 and 124 of the series-connected cells 118 which make up the RPEC element 108 provide the inputs into control means 150 When the poles of switch 152 are in the central position, EC element 110 is isolated from the RPEC element 108; when in the right hand position, they connect leads 112 and 114 (full voltage) to EC element 110 with positive (charging) polarity; when in the left hand position, they connect leads 112 and 133 (half voltage) to EC element with negative (discharging) polarity. Though not shown, a three pole switch may be used to substitute a set of batteries for the RPEC cells 118. This will allow the EC element to be coloured or bleached at night when no light shines on the PE element 108. If desired, it can be arranged that the PE element charges the battery.

Figure 3:
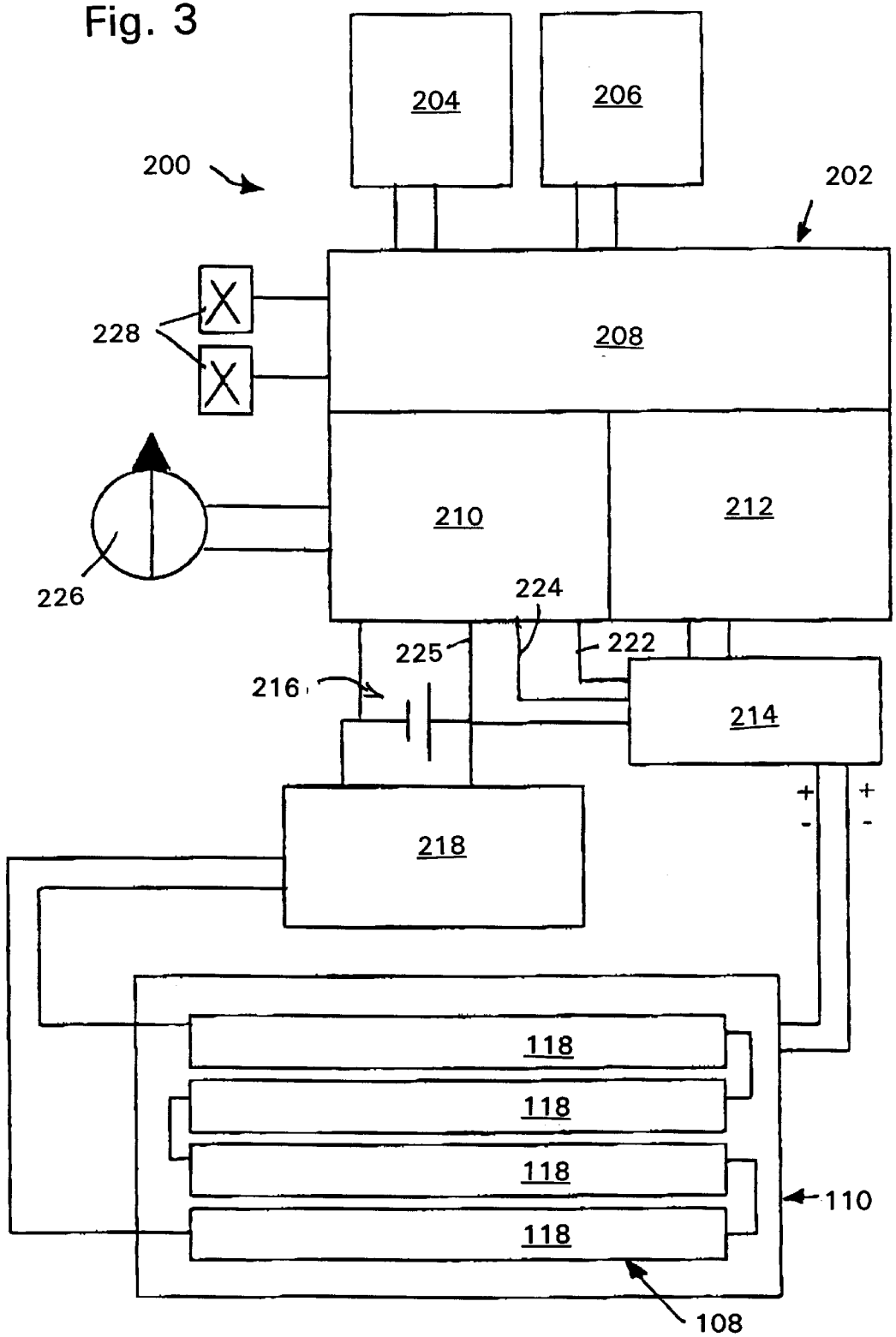
FIG. 3 is a block diagram of an example of a microprocessor-based control means suitable for use with the window of FIG. 1

FIG. 3 illustrates a more complex microprocessor-based control means 200 by which the smart window 100 of the first example can be controlled, window 100, RPEC element 108 and EC element 110 being illustrated diagrammatically. Control means 200 basically comprises a microprocessor unit 202 which is connected to a first EPROM 204 that stores the safe-charging profile (look-up-table) for EC element 110 and to a second EPROM 206 that stores the safe discharging profile (look-up-table) for element 110. Unit 202 will normally be a single chip which includes the microprocessor 208 itself, an analog to digital (A/D) signal interface 210 and a digital to analog (D/A) signal interface 212. Signal converter 212 is interfaced with EC cell 110 via a cell driver circuit 214.

Power for driver 214 is supplied from a battery 216 and/or the output of a voltage regulator and battery charger unit 218 that, in turn, receives power from RPEC cells 108 when they are illuminated. Unit also functions to isolate cells 108 from the battery when the cells are not illuminated. The circuits involved in charger/isolator unit 218 and driver circuit 214 will be familiar to a person skilled in the art. The design of such circuits does not form part of the present invention. In this example, A/D interface 210 is supplied with three continuous input signals: the battery voltage on line 220, the voltage present across the EC element 110 on line 222, and the current flowing to or from the EC element on line 224, the current signal being derived within driver circuit 214. In addition, A/D driver 210 is connected to receive command signals from an external command unit 226 which is illustrated as a manual control unit or switch, but which may be an input from a central building control system.

In this example, the total charge stored by or delivered to the EC element is computed continuously by the microprocessor unit 208 by integrating current flow to or from the cell with respect to time and by storing recent past history of charging and discharging events. It is also envisaged, however, that a circuit within driver 214 could derive a signal indicative of total charge delivered or withdrawn and feed that signal to the A/D interface 210. It is also envisaged that microprocessor unit 208 will keep a tally of the number of cycles to which cell 110 has been subjected as a proxy for the aging of the cell. In addition, microprocessor unit 208 desirably keeps a tally of the number of partial darkening or bleaching steps made since the last full bleach and forces a full bleach at regular intervals—preferably after every 5 to 10 partial commands—to 'zero' the cell before responding to a new command. Similarly, it is desirable to program the microprocessor to ensure that the cell is fully bleached on a regular time basis, preferably at least once in 24 hours. This will ensure that the charge held within the cell corresponds accurately with the charge computed by the microprocessor to be held within the cell.

Figure 4:
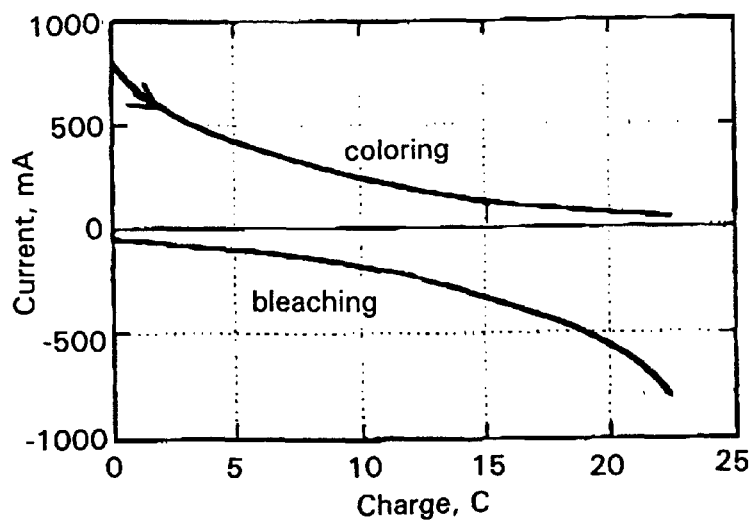
FIG. 4 is a graph illustrating typical safe charging and discharging profiles for the EC cell of the PEC window of FIG. 1.

Typical empirically-derived safe charging (colouring/darkening) and discharging (bleaching) profiles are illustrated by the graphs of FIG. 4. They relate the safe current in mA to the charge in Coulomb present in the EC element 110. The data from the colouring graph is stored as a charging look-up table in EPROM 204, while the data from the bleaching graph is stored as a discharging look-up table in EPROM 206. While the shape of these curves will be generally apply to any EC cell with the same working and counter electrodes, the magnitude of the safe current in will depend upon the size of the cell/window. Accordingly, when a window and its controller are first installed, the microprocessor needs to be 'told' about the size and nature of the window to which it is connected. This is simply done by setting configuration switches or the like at the time of installation. Such switches are diagrammatically shown at 228 in FIG. 2.

In operation, with EC element 110 of window 100 in its fully bleached state, the window illuminated and command unit 226 set to signify that the window is to remain bleached, the output of RPEC element 108 is used to charge battery 216 and no voltage is applied by driver 214 to EC cell 110.

If command unit 226 is then set to indicate that full darkening is required, microprocessor 208 inputs a code indicating zero charge to charging EPROM 204, causing it to output code indicative of the safe initial current (about 750 mA) and the charge to be delivered. Since element 110 is fully discharged, the initial current will be the absolute maximum safe current which element 110 can tolerate, and driver unit 214 is signalled to deliver that current to EC element 110. The current and voltage actually delivered (signified on line 224 and 222 respectively) are monitored by microprocessor and the current is integrated over time to derive the charge delivered. Every few seconds, microprocessor inputs to EPROM 204 a code indicating the charge so far delivered and evokes an output code from the look-up table indicative of the new safe current to be set. This process continues until either the required charge has been delivered or until a minimum current level has been reached, at which point, element 110 is disconnected from the power supply.

If part way through the charging process, or after it has been completed, a signal is received from command unit 228 indicating that a partial bleach is required, microprocessor 208 interprets the instruction as setting a target residual charge to be left in element 110 and calculates the charge to be removed. A corresponding input is fed to the discharge look-up table in EPROM 206 to generate a newt code indicative of the safe discharge current to be set and D/A unit 212 controls driver circuit 214 accordingly. Once again, the residual charge in element 110 is calculated every few seconds and fed to EPROM 206 to generate a new safe current level. This process continues until the microprocessor calculates that the residual charge is equal to the charge corresponding to the colouration level set by the user.

Adjustment for cell aging can be accommodated in a number of ways by the use of microprocessor control means 200. For example, an aging EC element can be detected by an unusual rise in the voltage required to deliver the initial full charge current when the element is fully discharged; or, the number of times the element has been cycled can be counted. Compensation for aging can also be accommodated in a variety of ways. For example, the microprocessor can be programmed to reduce the currents read out from the look-up tables by a factor, or it can be programmed to use a new set of look-up tables in the EPROMs. The latter is preferred because, in general, aging modifies the shape of the safe current is profiles. For example, minimum cut-off currents can be retained for the cell at all ages while initial charge rates are reduced with cell aging.

Referring now to FIG. 2, the second example of a PEC smart window will be described. This device is a two-pane smart window 300 that combines a single-cell RPEC element 302 with a single-cell EC element 304. Element 302 is formed on the TCO-coated inner surface of one pane 306 by applying a layer 308 of porous nano-crystalline $TiO_2$ onto the TCO coating 310 and then impregnating it with a suitable electrolyte (not shown) as previously described. To seal the electrolyte in place, a layer 312 of a material which is ion-permeable but electron impermeable is applied to the $TiO_2$ layer 308, such materials being disclosed by Graetzel. A thin layer 314 of Pt is then applied to the surface of layer 312 and a final conductor 316 (eg, a conducting polymer) is applied over the Pt to serve as a current-carrying electrode. This electrode is connected to a lead 318 that is led from the window 300 for external connection, a second lead 320 being taken from TCO coating 310 on pane 306.

The EC element 304 is formed between centre electrode 316 and the second pane 322 which forms smart window 300, the inside face of pane 322 having a TCO coating 324 on which a vanadium oxide counter-electrode 326 is formed. The working electrode of element 304 is a layer 328 of tungsten oxide which is formed on the back of central electrode 316. The intervening space is then filled with an electrolyte containing a redox couple (eg, one based upon lithium). Finally, an electrical lead 322 is connected to TCO layer 326 to allow current to be supplied to cell 304 from outside window 300. The lead 322, along with leads 318 and 320, passing through edge seals 334.

Figure 5:
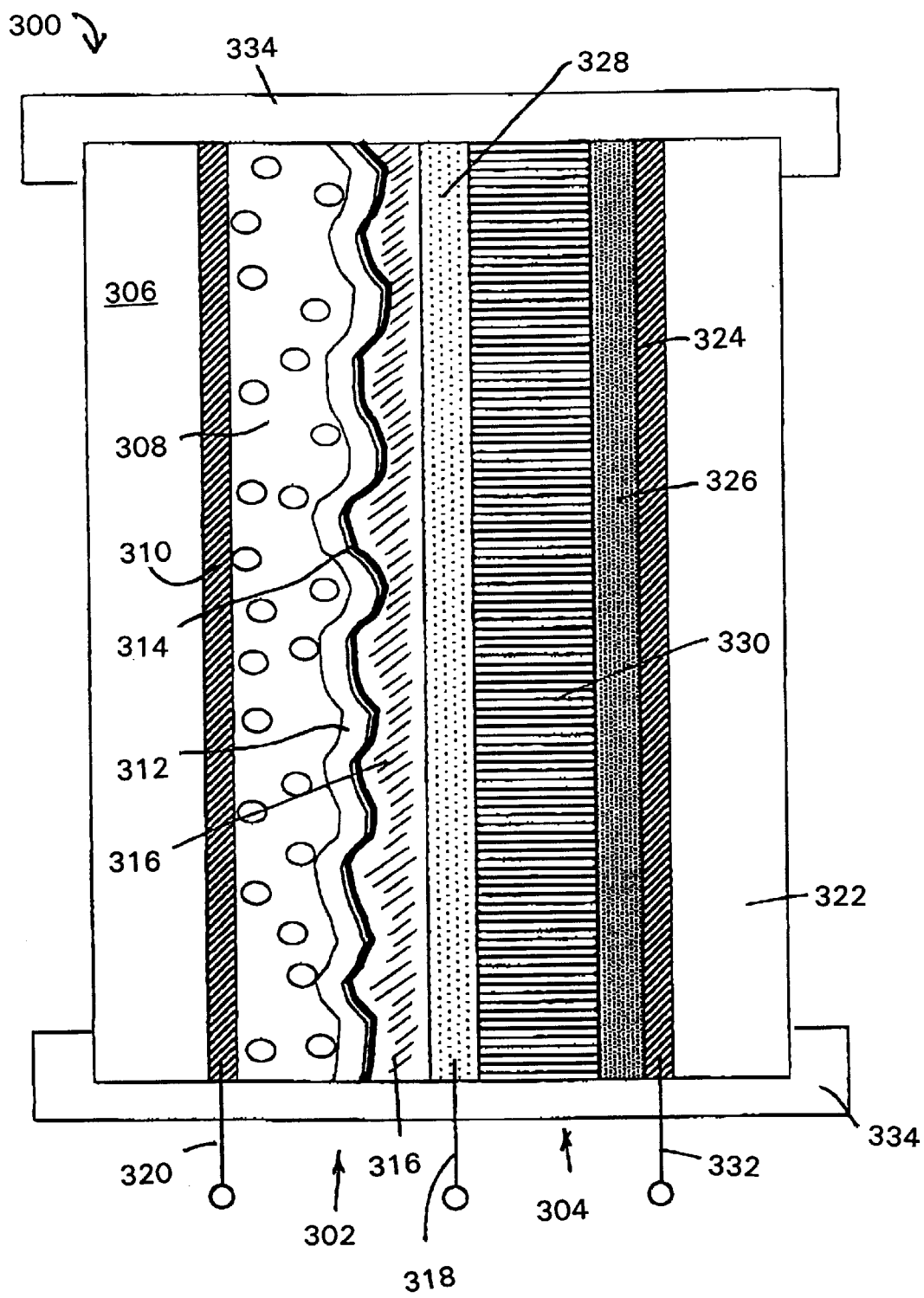
FIG. 5 is a diagrammatic sectional elevation of a two-pane smart window that forms the second example of a smart window formed in accordance with the present invention.

It will be seen that, in the PEC window of FIG. 5, the REPC cell 302 and the EC cell 304 share one common electrode or conductor (316) but not both electrodes. This allows the polarity of the current applied to the EC cell to be externally applied and reversed without affecting the REPC cell. It also has the important advantage that the cells do not share electrolytes.

Though the examples described above fulfil the objectives of the invention and exhibit the desired advantages, it will be appreciated by those skilled in the art that many modifications and alterations can be made without departing from the scope of the invention as defined by the following claims.

What is claimed is:

1. A smart window wherein:
    a transparent regenerative photoelectrochemical (PE) element extends over substantially the whole area of the window,
    a normally transparent electrochromic (EC) element also extends over substantially the whole area of the window,
    control means are provided for interconnecting said PE and EC elements and for regulating the flow of current therebetween to effect the darkening or bleaching of the EC element when light falls on the PE element,
    said control means is operable to connect the PE element to the EC element with one polarity to effect the darkening of the EC element and to connect the PE element to the EC element with the reverse polarity to effect the bleaching of the EC element.

2. A smart window according to claim 1 wherein:
    said PE element comprises a plurality of separate PE cells arranged side-by-side to extend across the window,
    at least two of said cells are adapted to be connected in series,
    electrical leads are arranged to provide external connections to said cells whereby two different voltages are available therefrom when the cells are illuminated, and
    said control means is adapted to apply one of said voltages to the EC element to effect darkening thereof and the other of said voltages to the EC element to effect the bleaching thereof.

3. A smart window according to claim 1:
    three transparent panes arranged in close-spaced parallel relationship to one another, the panes comprising:
    a center pane having first and second faces,
    a first outer pane having an inner and an outer face, the first outer pane being arranged so that said inner face and said first face are juxtaposed,
    and a second outer pane having an inner and an outer face, the second outer pane being arranged so that said inner face of the second pane and
    said second face are juxtaposed,
    said PE element formed between said first outer pane and said center pane, and
    said EC element formed between said second outer pane and said center pane.

4. A smart window according to claim 3 wherein:
    said first and second faces of the center pane have transparent conducting coatings formed thereon,
    said inner faces of the first and second outer panes have transparent conducting coatings formed thereon,
    said PE element comprises a plurality of elongate PE cells arranged in side-by-side array and extending substantially across said the window,
    each of said PE cells comprises an inner elongate electrode formed on the transparent conducting coating of the first face of the center pane, a outer elongate electrode formed on the inner transparent coating of the first outer pane and arranged opposite said inner electrode, and a liquid electrolyte contained between said electrodes,
    the electrolyte of one of said cells is prevented from mixing laterally with the electrolyte of an adjacent cell by a longitudinally-extending wall of conducting polymer,
    said wall is arranged to electrically connect the inner electrode of one cell to the outer electrode of an adjacent cell so that said one and said adjacent cells are electrically arranged in series.

5. A smart window according to claim 1 wherein said control means comprises:
    a microprocessor-based controller adapted to compute the charge status of the window and adapted to control current flow to and from the window,
    read only memory means storing look-up tables relating maximum safe current for the window with respect to the charge status of the window such that an input indicative of the present charge status of the window will generate an output from the memory means indicative of the current to be applied to the window to achieve a desired target charge status.

6. A smart window according to claim 5 wherein said control means is incorporated within the window together with a battery that is arranged to be charged by the PE element and, when desired, to be connected to effect the charging or discharging of the EC element.

7. A smart window wherein:
    a transparent regenerative photoelectrochemical (PE) element extends over substantially the whole area of the window,
    a normally transparent electrochromic (EC) element also extends over substantially the whole area of the window,
    said EC element comprises a plurality of series-connected PE cells arranged in substantially coplanar side-by-side juxtaposition, and electrical leads are arranged to form externally accessible electrical connections to more than one of said cells so that, when the window is exposed to light, at least one higher and one lower voltage will be present on said leads, said higher voltage being suitable for charging said EC cell and said lower voltage being suitable, with appropriate polarity, for discharging said EC cell.

8. A smart window wherein:
    a first transparent pane and a second transparent pane are arranged in close-spaced parallel relationship to one another,
    said first pane has an inner and an outer face, a transparent conductive coating being formed on the inner face of the first pane,
    said second pane has an inner and an outer face, a transparent conductive coating, being formed on the inner face of the second pane, the panes are arranged so that their inner faces are juxtaposed opposite one another but spaced from one another, layers comprising the working electrode and electrolyte and the counter electrode of a transparent regenerative photoelectrochemical (RPEC) cell formed on the transparent coating of the first pane, layers comprising the working electrode, electrolyte and the counter electrode of a transparent electrochromic (EC) cell formed on the transparent conductive coating of the second pane, a central transparent conductive layer connecting and extending between the innermost electrode layers of the RPEC and EC cells over substantially their entirety, and electrical leads providing separate external electrical access to said transparent conductive coating on the inner face of the first pane, said transparent conductive coating on the inner face of the second pane and to said central conductive layer.

9. A smart window according to claim 8 wherein:

the working electrode and the counter electrode of the RPEC cell are separated by a polymer layer which is capable of conducting the charge carriers of the cell but is an electronic insulator, and said central transparent conductive layer is formed from a deformable or castable polymer.

* * * * *